(12) United States Patent
Barton et al.

(10) Patent No.: US 6,478,333 B1
(45) Date of Patent: Nov. 12, 2002

(54) COLLAPSIBLE STEERING COLUMN ASSEMBLY

(75) Inventors: Laurence George Herbert Barton; James Peter Bentley, both of Warwickshire; Yasuhisa Yamada, West Midlands, all of (GB)

(73) Assignee: NSK Steering Systems Europe Limited, Nottinghamshire (GB)

( * ) Notice: Subject to any disclaimer, the term of this patent is extended or adjusted under 35 U.S.C. 154(b) by 0 days.

(21) Appl. No.: 09/580,928

(22) Filed: May 26, 2000

(30) Foreign Application Priority Data

May 26, 1999 (GB) ................................................ 9912345

(51) Int. Cl.$^7$ ................................................ B62D 1/11
(52) U.S. Cl. .......................... 280/777; 74/492; 74/493; 188/371; 188/374; 280/775
(58) Field of Search ................................. 280/777, 775; 74/492, 493; 188/371, 374

(56) References Cited

U.S. PATENT DOCUMENTS

| | | | | |
|---|---|---|---|---|
| 3,590,655 A | * | 7/1971 | Robert | 280/777 |
| 4,887,782 A | * | 12/1989 | Carnell et al. | 280/777 |
| 4,989,898 A | * | 2/1991 | Yamaguchi et al. | 280/777 |
| 5,517,877 A | * | 5/1996 | Hancock | 74/492 |
| 5,547,221 A | * | 8/1996 | Tomaru et al. | 280/777 |
| 5,560,650 A | * | 10/1996 | Woycik et al. | 280/777 |
| 5,588,332 A | * | 12/1996 | Heederly | 74/492 |
| 5,609,364 A | * | 3/1997 | Fouquet et al. | 280/777 |
| 5,618,058 A | * | 4/1997 | Byon | 280/777 |
| 5,788,278 A | * | 8/1998 | Thomas et al. | 280/777 |
| 5,820,163 A | * | 10/1998 | Thacker et al. | 280/775 |
| 6,170,874 B1 | * | 1/2001 | Fosse | 280/777 |
| 6,189,929 B1 | * | 2/2001 | Struble et al. | 280/777 |
| 6,234,528 B1 | | 5/2001 | Ben-Rhouma et al. | 280/777 |

FOREIGN PATENT DOCUMENTS

| | | |
|---|---|---|
| DE | 19542491 | 2/1997 |
| EP | 1018463 | 7/2000 |
| GB | 2 309 204 | 7/1997 |
| GB | 2 331 964 | 6/1999 |
| WO | WO 95/00383 | 1/1995 |

* cited by examiner

Primary Examiner—Paul N. Dickson
Assistant Examiner—Toan C To
(74) Attorney, Agent, or Firm—Miles & Stockbridge P.C.

(57) ABSTRACT

A collapsible steering column assembly has an arrangement to absorb energy upon steering column collapse. In a preferred form, the arrangement includes a skid member acting to deform a length of wire having arms to embrace at least one retaining pin. The or each pin is selectively extendable and retractable in order to vary the energy absorption capability.

25 Claims, 2 Drawing Sheets

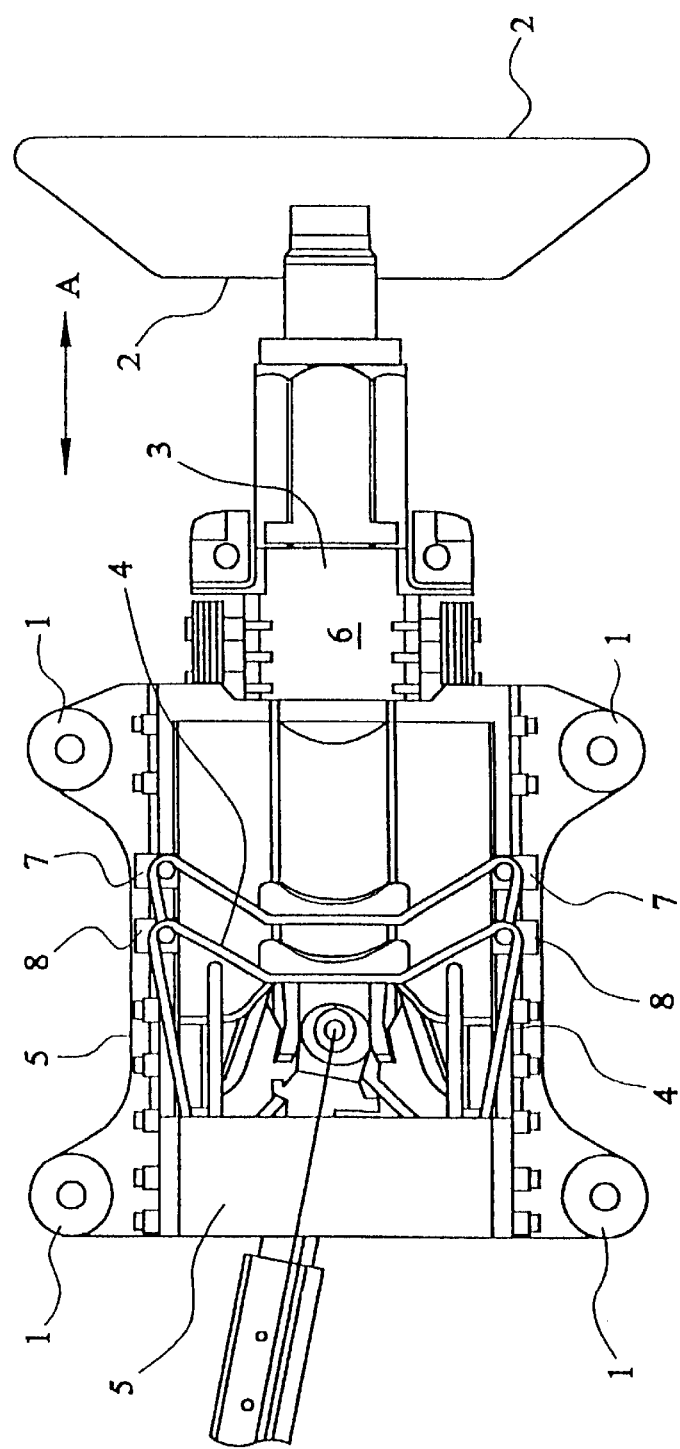
FIG. 2A
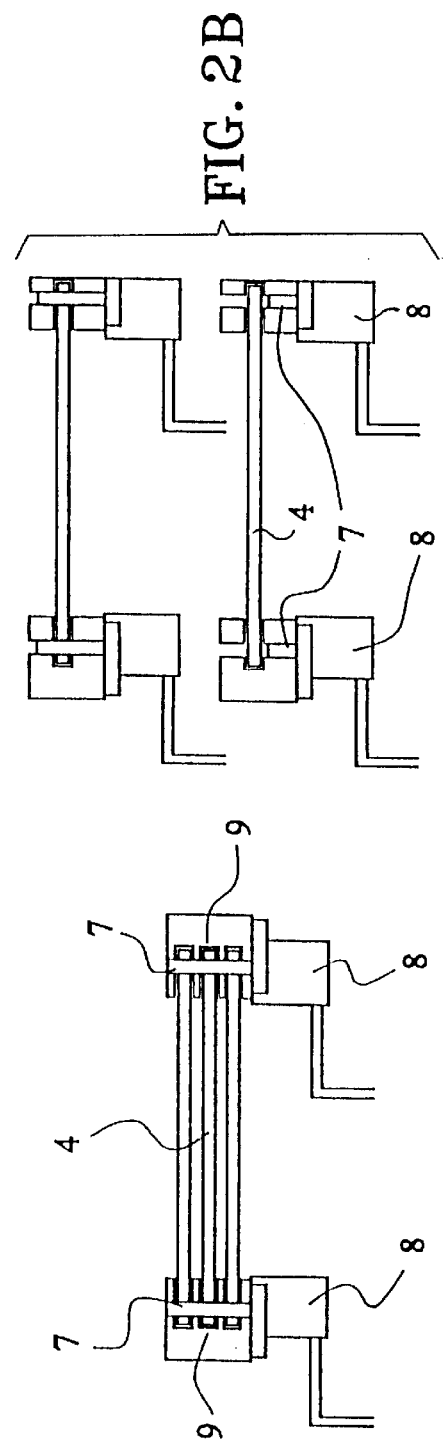
FIG. 2B
FIG. 2C

COLLAPSIBLE STEERING COLUMN ASSEMBLY

BACKGROUND OF THE INVENTION

This invention relates to a collapsible steering column assembly.

A collapsible steering column assembly is known from EP-A-0 705194 that includes means to absorb energy transmitted by the steering column upon collapse, the means including a generally U-shaped wire clip with arms embracing two pins, which are spaced-apart and between which a skid member, slidably housed within a mounting bracket, is guided and can pass to draw the clip over the pins to deform it.

Developments are now progressing towards "smart" steering columns.

SUMMARY OF THE INVENTION

An object of the present invention is to provide a steering column which can be collapsed in the event of a vehicle crash in a way that takes into account various physical characteristics of the driver, such as weight, posture, position and dimensions.

According to the present invention, there is provided a collapsible steering column assembly including means to absorb energy transmitted by the steering column upon collapse, said means including a deformable element associated with a mounting means of the steering column, the mounting means including a mounting bracket slidably housing a skid member coupled to the steering column and adjoining deformable element, so that, upon collapse of the steering column, said skid member is urged in a direction to deform said deformable element which thereby absorbs collapse energy, said deformable element being in the form of a length of wire, with arms arranged to embrace, during steering column collapse, at least one extendable and retractable pin, said skid member acting to draw the clip over said at least one pin to deform the wire.

The or each pin can be solenoid operated, with the pins being normally retracted.

In the event of vehicle crash, the or each solenoid is fired so that the or each pin can be selectively used in accordance with a predetermined setting for energy absorption depending upon the data received from the driver sensors.

More than one deformable wire can be provided and the or each solenoid can select/de-select wires to increase/decrease the energy absorption capability. This arrangement can be used with a single wire arrangement or a multiple stack of wires, with the or each solenoid activating its pin to a predetermined depth.

A further development would be to use pairs of solenoid-operated pins utilising only one wire in each unit.

BRIEF DESCRIPTION OF THE DRAWINGS

For a better understanding of the invention and to show how the same may be carried into effect, reference will now be made, by way of example, to the accompanying drawings, in which:

FIG. 2A is a diagrammatic view of the collapsible steering column assembly showing means to absorb energy transmitted by the steering column upon collapse;

FIG. 2B is a diagrammatic view illustrating the cooperation of an energy absorbing wire with extendable/retractable solenoid-operated pins; and FIG. 2C is a diagrammatic view illustrating an alternative embodiment and, in particular, the cooperation of a plurality of energy absorbing wires with a pair of extendible/retractable solenoid pins.

DETAILED DESCRIPTION OF THE PREFERRED EMBODIMENTS

Figure 1:
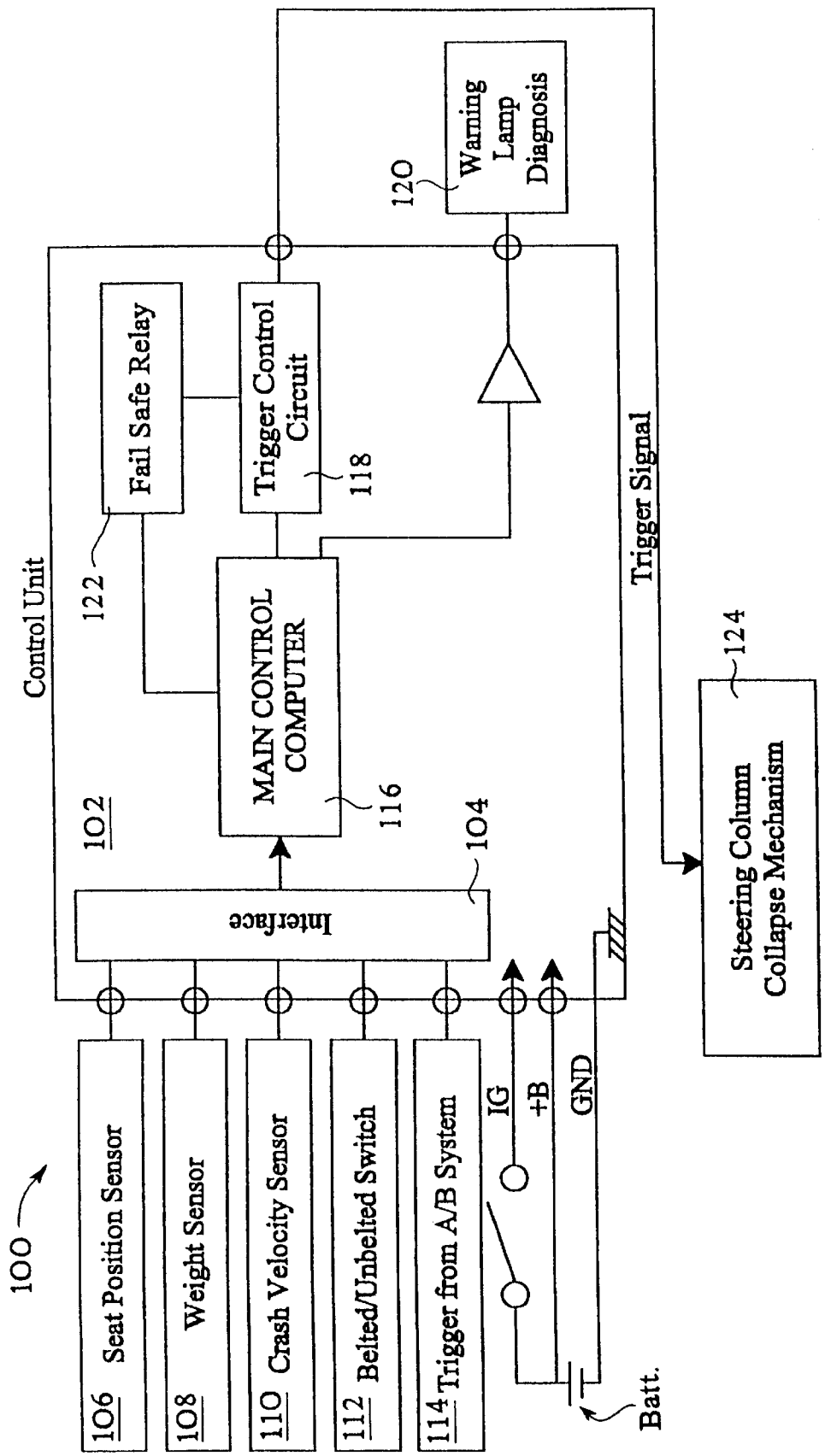
FIG. 1 is a diagram showing an arrangement of a control system for use in the present invention.

FIG. 1 is a block diagram illustrating a control system which may be used to implement the present invention. The control system calculates the weight, posture, and position of a driver, having entered the vehicle and assumed the driving position, and predetermines a setting for energy absorption. The control system includes a control unit 102 that receives, via an interface 104, signals from various elements, including a seat position sensor 106, a weight sensor 108, a crash velocity sensor 110, a belted/unbelted switch 112, and an A/B system trigger 114. The input signals are supplied from the interface 104 to a main control computer 116, which is in turn connected to a trigger control circuit 118 and a warning lamp diagnosis 120. The trigger control circuit 118 is also coupled to the main control computer through a fail safe relay 122, as shown. The trigger control circuit outputs a trigger signal to a steering column collapse mechanism 124 to be described hereinafter. Power is supplied to the system 100 from a battery BATT via lines +B and GND, as well as by way of a switched IG line.

In the present case, the pins 7 are extendable and retractable and can, as illustrated, be operated by solenoids 8.

In the form illustrated in FIG. 2, it will be noted that there are two wires 4, with two pairs of solenoid-operated pins 7. Once the weight, posture, position, etc. of the driver have been predetermined when the system is set to "active", the or each solenoid can be selected/de-selected to act on the or each wire to increase/decrease the energy absorption capability.

As illustrated, to support the pins 7 mechanically, they can be arranged to pass through racks 9 and, as illustrated, the wires 4 in this case can be stacked.

In the case where more than one wire 4 is used, then the mounting bracket 5 can be provided with a plurality of grooves to accommodate the wires 4.

The pins can be in the form of piloting solenoid valves or they could be hydraulically operated. In either case, the valves are given stepped protrusion ability, depending on the criteria discussed above.

It will be appreciated that, when more than one wire 4 is provided, the profile of each wire can be the same or can be different, to give yet further variations of energy absorption capability.

When the system is active, the data can be updated every few seconds, e.g., based on movement of the driver, which would result in a different posture and position, so that the updated data is taken into account on an almost continual basis.

What is claimed is:

1. A collapsible steering column assembly, comprising a steering column, means for mounting the steering column and means for absorbing energy transmitted by the steering column upon collapse, said means for absorbing energy including a deformable element associated with said mounting means of the steering column, said mounting means including a mounting bracket slidably housing a skid member coupled to the steering column and disposed so that, upon collapse of the steering column, said skid member is urged in a direction to deform said deformable element for absorbing collapse energy, said deformable element being in the form of a length of wire, with arms arranged to embrace, during steering column collapse, at least one extendable and retractable pin, said skid member acting to draw the wire over said at least one pin to deform the wire, wherein a plurality of said deformable wires are provided and the assembly further comprises means for selectively extending each pin in accordance with a predetermined setting for energy absorption depending upon data received from sensors for a vehicle occupant in order to select or de-select wires to increase or decrease, resepectively, the energy absorption capability.

2. An assembly according to claim 1, wherein each pin is solenoid operated and normally in a retracted position.

3. An assembly according to claim 1, wherein a stack of wires is provided with at least one said pin being activated to a predetermined depth in order to select a number of wires corresponding to said predetermined depth.

4. An assembly according to claim 1, wherein each pin is hydraulically operated.

5. An assembly according to claim 1, wherein the profiles of the wires differ.

6. A vehicle incorporating a collapsible steering column assembly according to claim 1.

7. An energy absorbing steering column assembly, comprising:

a collapsible steering column;

a plurality of deformable energy absorbing members cooperable with a displaceable portion of said collapsible steering column; and a mechanism operative to selectively position at least one drawing member in a first position at which an associated energy absorbing member can be drawn over said drawing member by collapse of said steering column to deform said energy absorbing member and thereby absorb energy of the collapse, and a second position at which said energy absorbing member is not drawn over said drawing member by collapse of said steering column.

8. An energy absorbing steering column assembly according to claim 7, wherein said mechanism is operative to position said drawing member in a plurality of positions, at each of which a different number of said energy absorbing members can be drawn over said drawing member by collapse of said steering column.

9. An energy absorbing steering column assembly according to claim 8, wherein there are a plurality of said drawing members.

10. An energy absorbing steering column assembly according to claim 7, wherein each said energy absorbing member has at least one drawing member associated therewith and selectively positionable as aforesaid by said mechanism.

11. An energy absorbing steering column assembly according to claim 10, wherein a plurality of said drawing members are associated with each energy absorbing member.

12. An energy absorbing steering column assembly according to claim 7, further comprising a control unit connected to said mechanism and operative to control said mechanism based on input from at least one sensor that senses a parameter related to a vehicle occupant.

13. An energy absorbing steering column assembly according to claim 7, wherein said energy absorbing members are wires.

14. An energy absorbing steering column assembly according to claim 7, wherein said drawing member is a pin, and said mechanism includes a solenoid operative to extend and retract said pin.

15. An energy absorbing steering column assembly according to claim 14, wherein said pin is extended when in said first position and retracted when in said second position.

16. An energy absorbing steering column assembly according to claim 15, wherein said energy absorbing members include a wire associated with said pin.

17. An energy absorbing steering column assembly according to claim 16, further comprising an urging member coupled to said steering column and disposed to urge said wire in a direction to draw said wire over said pin during collapse of said steering column.

18. A vehicle equipped with an energy absorbing steering column assembly according to claim 7.

19. An energy absorbing steering column assembly, comprising:

a collapsible steering column; and a plurality of deformable wires cooperable with a displaceable portion of said collapsible steering column, each having at least one associated extendable and retractable pin, said pin having an extended position at which the respective wire is drawn thereover by collapse of said steering column to deform the respective wire and thereby absorb energy of the collapse, and a retracted position at which the respective wire is not drawn thereover.

20. An energy absorbing steering column assembly according to claim 19, wherein said plurality of wires are disposed in a stacked arrangement and said pin has a plurality of extended positions, at each of which a different number of said wires can be drawn thereover by collapse of said steering column.

21. An energy absorbing steering column assembly according to claim 20, wherein each said wire has a plurality of said pins associated therewith, said wire having arms arranged to be drawn over respective ones of said pins.

22. An energy absorbing steering column assembly according to claim 19, wherein each said wire has a plurality of said pins associated therewith, said wire having arms arranged to be drawn over respective ones of said pins.

23. An energy absorbing steering column assembly according to claim 19, further comprising a control unit that controls the positioning of said pin based on input from at least one sensor that senses a parameter related to a vehicle occupant.

24. An energy absorbing steering column assembly according to claim 19, further comprising an urging member coupled to said steering column and disposed to urge each said wire in a direction to draw said wire over the associated pin in the extended position.

25. A vehicle equipped with an energy absorbing steering column assembly according to claim 19.

* * * * *